US008589890B2

(12) United States Patent  (10) Patent No.: US 8,589,890 B2
Eccles et al.  (45) Date of Patent: Nov. 19, 2013

(54) MECHANISM FOR MAINTAINING DETAILED TRACE INFORMATION RELEVANT TO THE CURRENT OPERATION BEING PROCESSED

(75) Inventors: Peter J. Eccles, Winchester (GB); Cameron J. McAllister, Eastleigh (GB); Hedley Proctor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1395 days.

(21) Appl. No.: 12/132,180

(22) Filed: Jun. 3, 2008

(65) Prior Publication Data

US 2009/0300295 A1  Dec. 3, 2009

(51) Int. Cl.
  *G06F 9/44* (2006.01)
(52) U.S. Cl.
  USPC ........... 717/128; 717/124; 717/126; 717/127; 711/117; 711/173
(58) Field of Classification Search
  USPC ............ 717/101–178; 711/1–221; 714/1–824
  See application file for complete search history.

(56) References Cited

U.S. PATENT DOCUMENTS

| | | | | |
|---|---|---|---|---|
| 5,732,272 A * | 3/1998 | Gochee | .......................... | 717/128 |
| 6,148,437 A * | 11/2000 | Shah et al. | ..................... | 717/128 |
| 6,182,210 B1 * | 1/2001 | Akkary et al. | .................. | 712/235 |
| 6,393,587 B2 * | 5/2002 | Bucher et al. | ................... | 714/39 |
| 6,434,665 B1 * | 8/2002 | Shepherd et al. | ............. | 711/118 |
| 6,467,083 B1 * | 10/2002 | Yamashita | .................... | 717/128 |
| 6,604,210 B1 * | 8/2003 | Alexander et al. | .............. | 714/39 |
| 6,728,949 B1 * | 4/2004 | Bryant et al. | .................. | 717/127 |
| 6,813,731 B2 * | 11/2004 | Zahavi et al. | .................... | 714/45 |
| 6,836,861 B2 * | 12/2004 | Chen et al. | ...................... | 714/45 |
| 7,047,521 B2 * | 5/2006 | Bunnell | .......................... | 717/130 |
| 7,194,731 B1 * | 3/2007 | Cantrill | .......................... | 717/128 |
| 7,600,221 B1 * | 10/2009 | Rangachari | .................... | 717/128 |
| 7,657,875 B2 * | 2/2010 | Alexander et al. | ............ | 717/128 |
| 7,882,337 B2 * | 2/2011 | Rivera | .......................... | 712/239 |
| 2002/0095660 A1 * | 7/2002 | O'Brien et al. | ............... | 717/127 |
| 2003/0088854 A1 * | 5/2003 | Wygodny et al. | ............. | 717/130 |
| 2004/0093538 A1 * | 5/2004 | Hester et al. | ..................... | 714/45 |
| 2006/0200806 A1 * | 9/2006 | Tasinga | .......................... | 717/128 |
| 2007/0255979 A1 * | 11/2007 | Deily et al. | ..................... | 714/45 |
| 2008/0134148 A1 * | 6/2008 | Clark | ............................. | 717/128 |

OTHER PUBLICATIONS

An Efficient Multi-level Trace Toolkit for Multi-threaded Applications—Vincent Danjean, Raymond Namyst, and Pierre-Andr'e Wacrenier—LaBRI / INRIA-Futurs, Universir'e Bordeaux 1—France, Aug. 2, 2005.*
Behar et al., "Trace Cache Sampling Filter", Proceedings of the 14th International Conference on Parallel Architectures and Compilation Techniques (PACT'05), 2005, IEEE.

* cited by examiner

*Primary Examiner* — Lewis A Bullock, Jr.
*Assistant Examiner* — Francisco Aponte
(74) *Attorney, Agent, or Firm* — Scully, Scott, Murphy & Presser, P.C.; Randall J. Bluestone, Esq.

(57) ABSTRACT

A system, method, computer program product, and program storage device for storing trace information of a program is disclosed. Upon entering or calling a subroutine, a memory buffer is created. Whenever a nested subroutine is called inside the subroutine, a subordinate memory buffer is created. Upon completion of a subroutine execution, a corresponding memory buffer is deleted. When encountering an event (e.g., an error, a defect, a failure, a warning) during execution, all data in currently existing memory buffers are transferred to a secondary memory storage device (e.g., a disk).

19 Claims, 5 Drawing Sheets

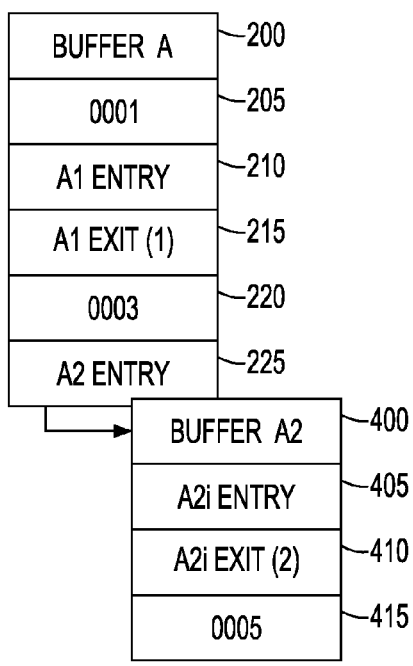

100 ▷ Sub A
105 ─ Trace data 0001
110 ─▷ Sub A1
115 ─ Trace data 0002
120 ─ Return (1)
125 ─ Trace data 0003
130 ─▷ Sub A2
135 ─────▷ Sub A2i
140 ───────── Trace data 0004
145 ───────── Return (2)
150 ───────── Trace data 0005
155 ───────── Return (3)
160 ───────── Trace data 0006
165 ─ Return (4)

FIG. 5

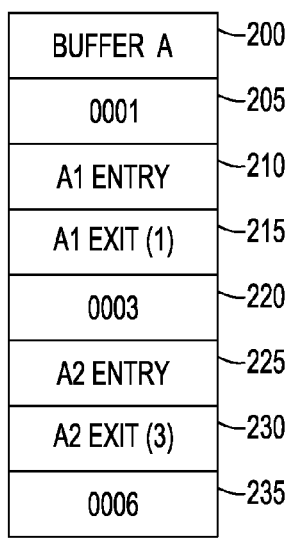

100 ▷ Sub A
105 ─ Trace data 0001
110 ─▷ Sub A1
115 ─ Trace data 0002
120 ─ Return (1)
125 ─ Trace data 0003
130 ─▷ Sub A2
135 ─────▷ Sub A2i
140 ───────── Trace data 0004
145 ───────── Return (2)
150 ───────── Trace data 0005
155 ───────── Return (3)
160 ───────── Trace data 0006
165 ─ Return (4)

FIG. 6

NOTE:
HERE, THE RETURN OF Sub A(4)
WOULD BE RETURNED TO ANY
BUFFER THAT CALLED Sub A,
ELSE THE PROGRAM HAS
EXITED, AND THE TRACE
BUFFER IS EMPTY.

100 ▷ Sub A
105 ___ Trace data 0001
110 ▷ Sub A1
115 ___ Trace data 0002
120 ___ Return (1)
125 ___ Trace data 0003
130 ▷ Sub A2
135 ▷ Sub A2i
140 ___ Trace data 0004
145 ___ Return (2)
150 ___ Trace data 0005
155 ___ Return (3)
160 ___ Trace data 0006
165 ___ Return (4)

FIG. 7

MECHANISM FOR MAINTAINING DETAILED TRACE INFORMATION RELEVANT TO THE CURRENT OPERATION BEING PROCESSED

BACKGROUND OF THE INVENTION

1. Fields of the Invention

The present invention generally relates to debugging an error in a program. More particularly, the present invention relates to generating and storing trace information (e.g., parameters passed to a called subroutine, return values of a subroutine, trace data) of a program to debug an error in the program.

2. Description of the Prior Art

Application tracing is important to provide trace information when a program has failed. For example, the application tracing has following requirements;

- trace as much usefull detail as possible;
- do not store too much information;
- trace as little information as possible that is unrelated to an event (e.g., a failure, a defect, an error, a warning) to diagnose;

Currently, a lot of large applications use proprietary tracing software, but the tracing software is often based on common systems. For example, a programming language Java comes with a built-in tracing application (e.g., java.util.logging (also known as JSR 47)).

When the application tracing detects an event (e.g., an error, a failure, or a problem), traditional solutions turn up a tracing level (e.g., a tracing level OFF indicates gathering no information to trace out; a tracing level LOW indicates gathering a very high level view information; a tracing level HIGH indicates gathering large amounts of debug information, but may affect a system performance due to large amounts of I/O operation and consume lots of storage space) for the detected event to gather information necessary to recreate the event.

These traditional solutions have two disadvantages:

- The traditional solutions require the event (e.g., an error, a failure, or a problem) to be recreated, so that a sufficient amount of data is collected. However, recreating the event is not always possible in a customer environment.
- The traditional solutions gather all information traced from where an event occurred.
- However, the gathered information may be a substantial amount, causing a difficulty in analyzing the gathered information by a user (e.g., a product developer, an application developer). Furthermore, gathering information impacts a system performance by increasing resource usages (e.g., a memory usages increase, a CPU usage increase, a hard disk usage increase).

In traditional solutions, circular buffers are often used to store a limited amount of detailed trace data (e.g., brief summary of recently executed operation). When an event occurs, the detailed trace data in the circular buffer is transferred to a secondary storage device (e.g., a disk) for a later analysis. However, using the circular buffer has limitations:

- The circular buffer will often wrap around, loosing important information (e.g., initial configuration and setup information)
- The circular buffer may be full of lots of detailed data. However, most of the data in the circular buffer may be unrelated information to an event (e.g., an error, a defect, a failure).

Alexander, III et al (U.S. Pat. No. 6,604,210 B1) discloses a method and system for detecting and recovering from errors in trace data. The trace data records selected events for executing routines and the routines corresponding to the events are represented as one or more nodes in a tree structure. The events may be entries and exits to executing methods.

A non-patent literature entitled "Trace Cache Sampling Filter", Michael Behar et al., Proceedings of the 14$^{th}$ International Conference on Parallel Architectures and Compilation Techniques (PACT'05), 2005 IEEE, IEEE Computer Society, discloses a technique for efficient usage of small trace caches. A trace cache can significantly increase the performance of wide out-of-order processors, but to be effective, the size of the trace cache should be large.

It would be desirable to provide a system and method for maintaining detailed trace information relevant to a current operation being processed in a program.

SUMMARY OF THE INVENTION

The present invention is a system and method for storing trace information relevant to an event encountered and removes trace information that is not necessary to analyzing the event.

For one aspect, a memory buffer is created when a subroutine in an executing program is called. Trace data generated during executing the subroutine is stored in the created memory buffer. If the subroutine calls a nested subroutine, a subordinate memory buffer is created. Trace data generated during executing the nested subroutine is stored in the subordinate memory buffer. When a subroutine completes its execution (e.g. returns a value at the end of execution), a corresponding memory buffer (i.e. the memory buffer that is created when the subroutine is called) is deleted. When an event occurs during an execution, all contents in currently existing memory buffers are transferred to a secondary storage device (e.g. a disk).

Thus, there is provided a system for storing trace information of a program to debug an error in the program comprising:

a PC (Program Counter) register for traversing program codes in the program in an executable order;

a main memory buffer for storing one or more of: trace data of the program, an entry data of a subroutine, and an exit data of the subroutine;

a first-level memory buffer, being created when the subroutine is called for execution, for storing trace data related to the subroutine execution;

means for linking the main memory buffer and the first-level memory buffer, the first-level memory buffer being a subordinate of the main memory buffer; and means for deleting the first-level memory buffer and any stored trace data when the subroutine completes execution.

Thus, there is provided a method for storing trace information of a program to debug an error in the program comprising:

traversing program codes in the program in an executable order;

creating a main memory buffer for storing one or more of: trace data of the program, an entry data of a subroutine, and an exit data of the subroutine;

upon calling the subroutine for execution, creating a first-level memory buffer for storing trace data related to the executing subroutine;

linking the main memory buffer and the first-level memory buffer, the first-level memory buffer being a subordinate of the main memory buffer; and deleting the first-level memory buffer and any stored trace data when the subroutine completes execution.

In one embodiment, the present invention removes unnecessary trace information in non-linear format by storing trace information in a tree of memory buffers (e.g., in a cache memory or a main memory). A memory buffer is discarded, when the trace information, which the memory buffer stores, becomes sufficiently unimportant (e.g., if a subroutine completes its execution without an event, a corresponding memory buffer, (i.e., a memory buffer which is created when the subroutine is called), is discarded).

The present invention has advantages over traditional solutions:

- Data in existing memory buffers are always relevant to a current operation being executed. When an event occurs and transferring data to a secondary storage device (e.g., a disk) is requested, the data transferred to the secondary storage device will be specific to the event.
- Only a relatively small amount of trace information (e.g., trace data, a subroutine entry data, a subroutine exit data) is stored in a main memory device. Therefore, transferring trace information to the secondary storage device can be quick. Less main memory spaces are required to store trace information.
- The trace information stored in memory buffers is closely related to a current stack trace.
- The data transferred to the secondary storage device is pre-pruned (e.g., when a subroutine completes its execution, a corresponding memory buffer is discarded).
- A high level of tracing is maintained (e.g., by recording a subroutine entry data and exit data in a superior memory buffer).
- At the time an error occurs, trace information in currently existing memory buffers provide enough information to debug an error or a failure without trying to recreate the error or the failure and without gathering trace information at a higher tracing level (e.g., tracing level HIGH).

BRIEF DESCRIPTION OF THE DRAWINGS

The accompanying drawings are included to provide a farther understanding of the present invention, and are incorporated in and constitute a part of this specification. The drawings illustrate embodiments of the invention and, together with the description, serve to explain the principles of the invention. In the drawings, FIGS. 1-7 illustrate an exemplary embodiment of the present invention.

DETAILED DESCRIPTION

For purpose of description, and in a non-limiting way, a program, which comprises subroutines, as referenced to herein includes and exhibits at least the following characteristics:

- Record an entry data (e.g., When a first subroutine is called by a second subroutine, the second subroutine lists or records parameters passed to the first subroutine);
- Perform some operations (e.g., mathematical operations);
- Record trace data about what it is doing (e.g., brief summary of recently executed operation);
- Call other subroutines;
- Record an exit data (e.g., When a subroutine returns a value, the subroutine lists or records the return value);
- Return some information to the subroutine that called it (e.g., a first subroutine, which is called by a second subroutine, returns a value to the second subroutine at the end of execution).

FIGS. 1-7 depicts an exemplary embodiment of the present invention. Lines 100-165 in the FIGS. 1-7 illustrates exemplary program codes in a program called Sub A (i.e., Subroutine A). At FIG. 1, when the Sub A is called or initiated by executing line 100, a memory buffer A (200) is created. In one embodiment, a memory buffer (e.g., a memory buffer A (200)) is directly created by a tracing application (e.g., java.util.logging (also known as JSR 47)). An executing program informs the tracing application which code in the program is executed (e.g., Sub A is called or Sub is executed). Then, the tracing application creates a memory buffer for the called or executed subroutine. A size of a memory buffer (e.g., a memory buffer A (200)) is an implementation choice. In one embodiment, a size of a memory buffer can be flexible or adjustable to grow, as more space is needed. In one embodiment, the Sub A is a main function, and the memory buffer A is a main memory buffer. In one embodiment, a program counter (PC) register is utilized to point to a currently executing code (e.g., a starting address of Sub A).

Figure 1:
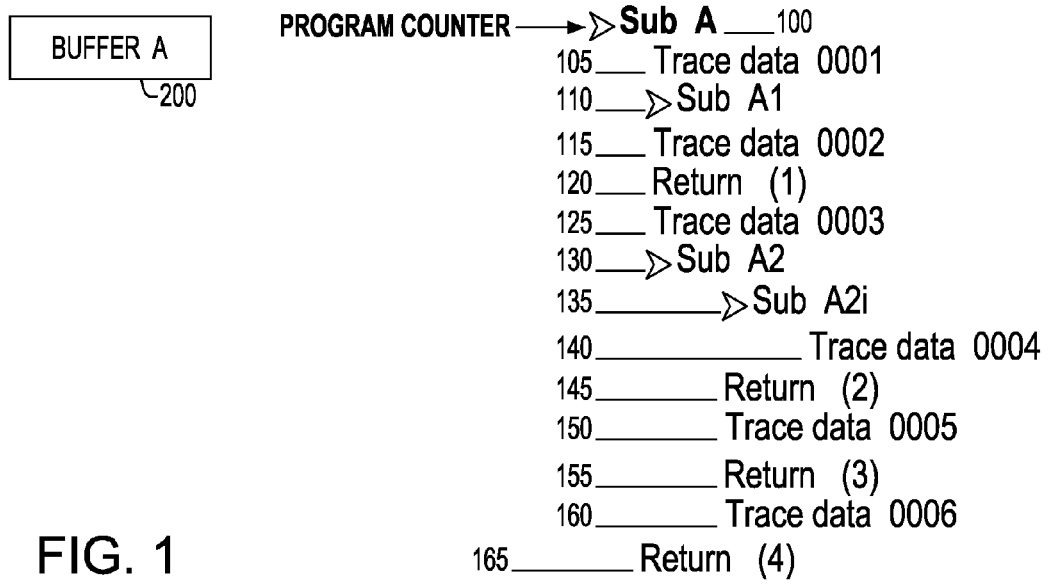
Figure 2:
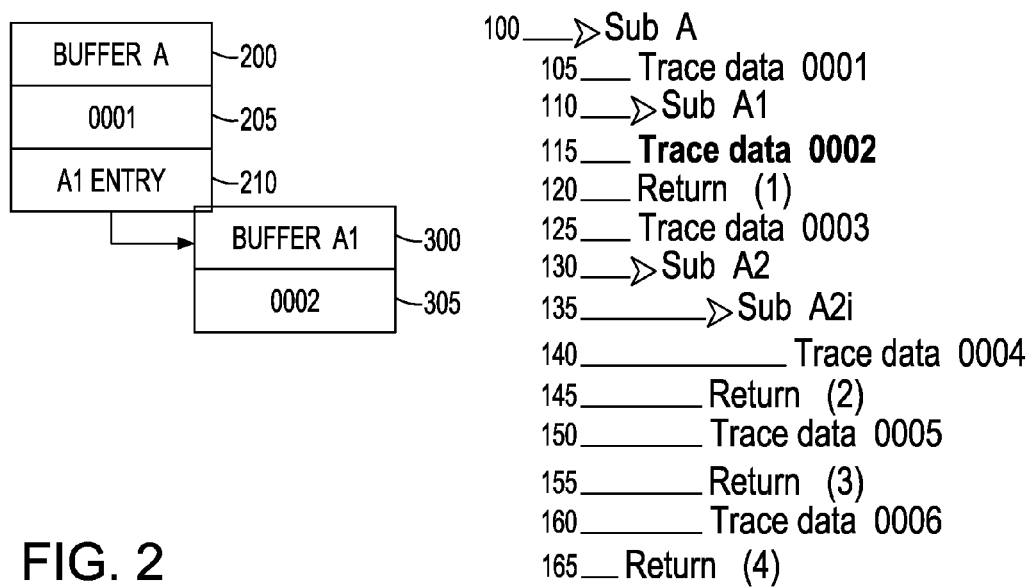

FIG. 2 illustrates the program execution from line 105 to line 115. When line 105 is executed, a trace data 0001 (205) of the Sub A is recorded to the memory buffer A (200). At line 110, when Sub A1 (i.e., a subroutine A1) is called, Sub A1's entry data (210) (e.g., parameters passed to Sub A1) is recorded to the memory buffer A (200) and a memory buffer A1 (300) (e.g., a first-level memory buffer) is created. In one embodiment, parameters passed to a called subroutine (e.g., Sub A1) are dependent on programming languages. However, generally, almost anything that is touched by a currently executing program can be passed to a subroutine as a parameter. The memory buffer A1 (300) is linked to the memory buffer A (200) as a subordinate memory buffer. When line 11 5 is executed, a trace data 0002 (305) of the Sub A1 is recorded to the memory buffer A1 (300).

Figure 3:
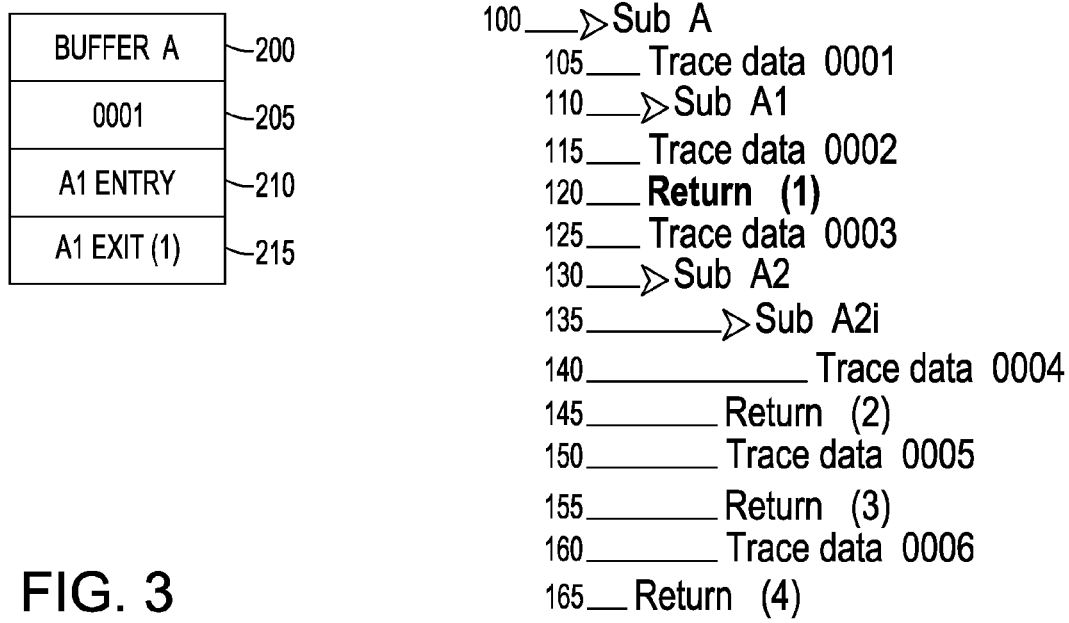

FIG. 3 illustrates the program execution at line 120. When line 120 is executed, Sub A1 completes its execution by returning a value (e.g., 1). After line 120 is executed, the return value (215) of Sub A1 is recorded to the memory buffer A (300). If Sub A1 is completed without an event (e.g., an error, a failure, a warning) by executing lines 110-120 successfully, the memory buffer A1 (300) is discarded after line 120 is executed. If an event occurs during the program execution, all contents of currently existing memory buffers are transferred to a secondary storage device (e.g., a disk). For example, if an error occurs at line 115, the trace data of Sub A (205), Sub A1 entry data (210), and the trace data of Sub A1 (305) (i.e., as shown in FIG. 2) are transferred to a secondary storage device.

Figure 4:
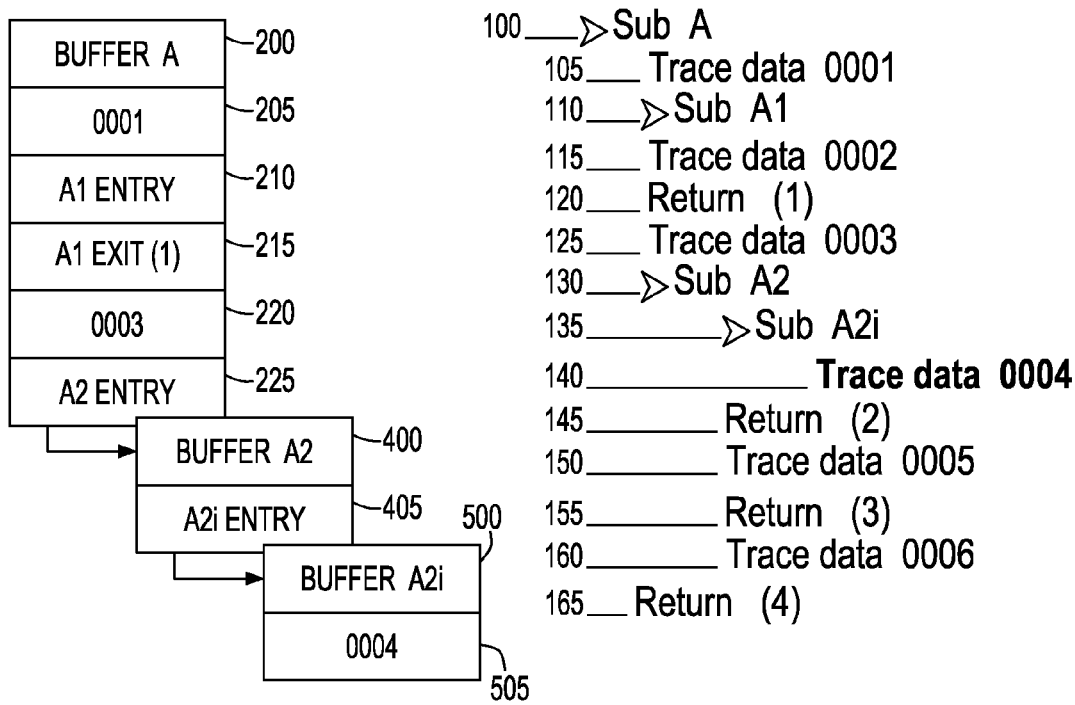

FIG. 4 illustrates the program execution from line 125 to line 140. When line 125 is executed, a trace data 0003 (220) of Sub A is recorded to the memory buffer A (200). When Sub A2 (i.e., a Subroutine A2) is called at line 130, a Sub A2 entry data (225) is recorded to the memory buffer A (200) and a memory buffer A2 (400) is created. The memory buffer A2 (400) is linked to the memory buffer A (200) as a subordinate memory buffer. When Sub A2i (i.e., a Subroutine A2i) is called at line 135, a Sub A2i entry data (405) is recorded to the memory buffer A2 (400) and a memory buffer A2i (500) is created. The memory buffer A2i (500) is linked to the memory buffer A2 (400) as a subordinate memory buffer. When line 140 is executed, a trace data 0004 (505) of Sub A2i is recorded in the memory buffer A2i (500). If an error occurs during an execution, all contents of currently existing memory buffers are transferred to a secondary storage device. For example, when an error occurs at line 140, trace data of Sub A (205, 220), Sub A1 entry data (210), Sub A1 exit data (215), Sub A2 entry data (225), Sub A2i entry data (405), trace data of Sub A2*i* (505) (i.e., as shown in FIG. 4) are transferred to a secondary storage device.

FIG. 5 illustrates the program execution from line 145 to line 150. After line 145 is executed, the memory buffer A2*i* (500) is discarded and a Sub A2*i* exit data (410) is written to the memory buffer A2 (400). When line 150 is executed, a trace data 0005 (415) of Sub A2 is recorded to the memory buffer A2 (400).

FIG. 6 illustrates the program execution from line 155 to line 160. After line 155 is executed, the memory buffer A2 (400) is discarded and a Sub A2 exit data (230) is recorded to the memory buffer A (200). When line 160 is executed, a trace data 0006 (235) of Sub A is recorded to the memory buffer A (200).

FIG. 7 illustrates the program execution at line 165. After line 165 is executed, the memory buffer A (200) is discarded. If Sub A was called by a superior subroutine, Sub A exit data may be recorded to a superior memory buffer. Otherwise, the program finishes execution.

Figure 8:
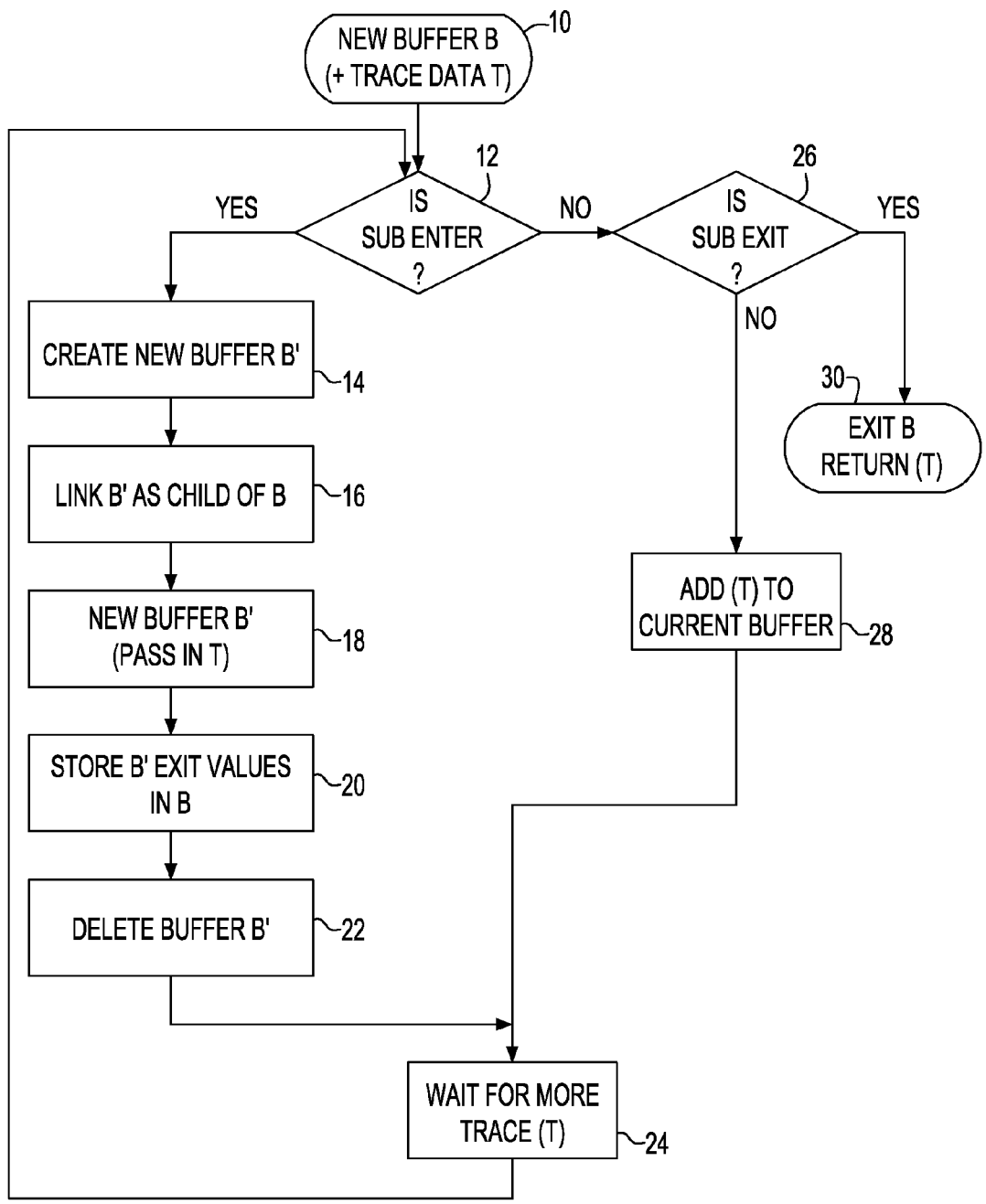
FIG. 8 illustrates a flow chart that the one embodiment of the present invention employs.

FIG. 8 is a flow chart depicting a methodology according to one embodiment of the present invention. At step 10, when a subroutine B entry event (i.e., Subroutine B is called by a program to be executed) occurs, a memory buffer B is created and starts to store trace data of the subroutine B. At step 12, it is checked whether a nested subroutine is called in the subroutine B. If a nested subroutine B' is called, at step 14, a memory buffer B' is created. At step 16, the memory buffer B' is linked to the memory buffer B as a child memory buffer (i.e., a subordinate memory buffer). How to link memory buffers is an implementation choice. In exemplary embodiment, memory buffers are linked via a linked list and a data structure having references or pointers. Therefore, there is a memory pointer at the end of a memory buffer. The memory pointer stores an address of another memory buffer. A memory pointer can be obtained by a memory allocation request to an operating system. Returning to the FIG. 8, trace data of the nested subroutine B' is stored in the memory buffer B' at step 18. At step 20, when the nested subroutine B' completes its execution (e.g., returns a value), an exit data of the nested subroutine B' is recorded to the memory buffer B. At step 22, the memory buffer B' is discarded. At step 24, more trace data of the subroutine B is recorded to the memory buffer B. If a nested subroutine is not called at step 12, it is checked whether the subroutine B completes execution (e.g., executes a return command) at step 26. If the subroutine B continues its execution, at step 28, trace data of the subroutine B is recorded to the memory buffer B and more trace data (T) of the subroutine B is recorded to the memory buffer B at step 24. If the subroutine B completes its execution (e.g., executes a return command), at step 30, an exit data of the subroutine B is recorded to a superior memory buffer (if the subroutine B is called by a superior subroutine). The memory buffer B is discarded.

In one embodiment, trace information (e.g., trace data, subroutine exit data, subroutine exit data) is removed from memory buffer(s) in a non-linear format (e.g., pruning out trace information in a memory buffer when the trace information becomes unnecessary (e.g., when a subroutine completes its execution)). In this embodiment, the trace information is stored in a tree of memory buffers:

Each node in the tree is a memory buffer. (Adding and deleting a memory buffer is exactly like adding and deleting a node in a tree.)

A node can have only one child node at a certain moment. Adding and deleting a node (i.e., adding and deleting a memory buffer) occur only at the deepest level of the tree (e.g., a leaf node).

Regular trace information (e.g., trace data) is stored on a current node (i.e., a newly created memory buffer).

A subroutine call makes a child node under the current node. Then, the child node is set to the current node. Trace data of the subroutine is stored in the current node.

When a subroutine completes its execution (e.g., return a value), the current node traverse to its parent node and set the parent node to the current node. The child node of the current node is deleted. An exit data of the completed subroutine is stored in the current node.

In another embodiment, especially executing a parallel application written by a parallel programming language (e.g., F#, parallel C++, Ocamlp31, occam, Charm++, Unified Parallel C), a node (i.e., a memory buffer) in the tree can have more than one child node (i.e., more than one subordinate memory buffers) at a certain time. In addition, if a program is executed an out-of-order (i.e., not sequentially), adding and deleting a node can occur at any level of the tree (e.g., a superior memory buffer can be deleted before its subordinate memory buffer is discarded). In an alternative embodiment, memory buffers are connected each other in the form of a linked list or a stack.

In one embodiment, a Program Counter (PC) register is implemented to traverse program codes in a program in an executable order (e.g., sequentially or concurrently). In this embodiment, the Program Counter is always in a current node (i.e., a newly created memory buffer) and is in the deepest level node (i.e., the most subordinate memory buffer) of the tree. In a multi-threaded environment, each thread has its own Program Counter. In another embodiment, especially executing a parallel application, a plurality of Program Counters points to concurrently executing program codes and exists in corresponding memory buffers. For example, at FIG. 4, if line 125 and line 140 are concurrently executed, a Program Counter is in the memory buffer A (200) and another Program Counter is in the memory buffer A2*i* (500).

In one embodiment, trace information (e.g., trace data, subroutine exit data, subroutine exit data) is closely related to how a stack trace may look like at the moment of execution. For example, at FIG. 4, when lines 100-140 are executed, memory buffers (i.e., a memory buffer A, a memory buffer A2, a memory buffer A2*i*) stores trace data of Sub A (205, 220), Sub A1 entry data (210), Sub A1 exit data (215), Sub A2 entry data (225), Sub A2*i* entry data (405), and trace data of Sub A2*i* (505) as shown at FIG. 4. A stack trace at the point of executing line 140 may look like:

data of Sub A2*i*
 entry data of Sub A2*i*
 entry data of Sub A2
 data of Sub A
 data of Sub A Therefore, when an error occurs, memory buffers stores direct nested trace information (e.g., in memory buffers) for a subroutine where the error occurs. The direct nested trace information looks like a stack trace as shown above.

In one embodiment, trace information (e.g., trace data, a subroutine entry data, a subroutine exit data) is stored in a main memory device (e.g., DRAM, SRAM, Flash Memory) and generates a file only on an event (e.g., occurred in a subroutine). The file is transferred to a secondary storage device for a future analysis. This embodiment is called "first failure data capture".

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for storing trace information of a program to debug an error in the program comprising:
    a processor;
    a PC (Program Counter) register for traversing program codes in the program in an executable order;
    a main memory buffer for storing one or more of: trace data of the program, an entry data of a subroutine, and an exit data of the subroutine;
    a first-level memory buffer, being created when the subroutine is called for execution, for storing trace data related to the subroutine execution,
    wherein the processor is configured to perform steps of:
    linking the main memory buffer and the first-level memory buffer, the first-level memory buffer being a subordinate of the main memory buffer;
    deleting the first-level memory buffer and any stored trace data, without transferring the trace data stored in the first-level memory buffer, in response to that the subroutine successfully completes the execution; and
    transferring all contents of currently existing memory buffers to a storage device, in response to that an error or a failure occurs during running the program,
    wherein the transferred contents of the currently existing memory buffers are used to debug the error or the failure without attempting to recreate the error or the failure.

2. The system according to claim 1, wherein the processor is further configured to perform a step of: writing the entry data of the subroutine to the main memory buffer when the subroutine is called in the program.

3. The system according to claim 1, wherein the processor is further configured to perform a step of: writing the exit data of the subroutine to the main memory buffer when the subroutine completes execution.

4. The system according to claim 1, further comprising: a second-level memory buffer, being created when the subroutine calls a nested subroutine, for storing trace data of the nested subroutine, the second-level memory buffer being a subordinate of the first-level memory buffer.

5. The system according to claim 4, wherein the processor is further configured to perform a step of: writing an entry data of the nested subroutine to the first-level memory when the nested subroutine is called.

6. The system according to claim 4, wherein the processor is further configured to perform a step of: writing an exit data of the nested subroutine to the first-level memory when the nested subroutine completes execution.

7. The system according to claim 4, wherein the processor is further configured to perform a step of: deleting the second-level memory buffer when the nested subroutine completes execution.

8. The system according to claim 1, wherein the processor is further configured to perform a step of: transferring all data in the currently existing memory buffers to a secondary storage device upon encountering an event.

9. A method for storing trace information of a program to debug an error in the program comprising:
    traversing program codes in the program in an executable order;
    creating a main memory buffer for storing one or more of: trace data of the program, an entry data of a subroutine, and an exit data of the subroutine;
    upon calling the subroutine for execution, creating a first-level memory buffer for storing trace data related to the executing subroutine;
    linking the main memory buffer and the first-level memory buffer, the first-level memory buffer being a subordinate of the main memory buffer;
    deleting the first-level memory buffer and any stored trace data, without transferring the trace data stored in the first-level memory buffer, in response to that the subroutine successfully completes the execution; and transferring all contents of currently existing memory buffers to a storage device, in response to that an error or a failure occurs during running the program, wherein the transferred contents of the currently existing memory buffers are used to debug the error or the failure without attempting to recreate the error or the failure.

10. The method according to claim 9, further comprising: writing the entry data of the subroutine to the main memory buffer when the subroutine is called in the program.

11. The method according to claim 9, further comprising: writing the exit data of the subroutine to the main memory buffer when the subroutine completes execution.

12. The method according to claim 9, further comprising: upon calling a nested subroutine inside the subroutine, creating a second-level memory buffer for storing trace data of the nested subroutine, the second-level memory buffer being a subordinate of the first-level memory buffer.

13. The method according to claim 12, further comprising: writing an entry data of the nested subroutine to the first-level memory when the nested subroutine is called.

14. The method according to claim 12, further comprising: writing an exit data of the nested subroutine to the first-level memory when the nested subroutine completes execution.

15. The method according to claim 12, further comprising: deleting the second-level memory buffer when the nested subroutine completes execution.

16. The method according to claim 9, further comprising: transferring all data in the currently existing memory buffers to a secondary storage device upon encountering an event.

17. A computer program product comprising a non-transitory computer usable medium having computer readable program code embodied therein for enabling a computer to store trace information of a program to debug an error in the program, the computer program code for causing a computer to perform method steps of:

traversing program codes in the program in an executable order; creating a main memory buffer for storing one or more of: trace data of the program, an entry data of a subroutine, and an exit data of the subroutine;

upon calling the subroutine for execution, creating a first-level memory buffer for storing trace data related to the executing subroutine;

linking the main memory buffer and the first-level memory buffer, the first-level memory buffer being a subordinate of the main memory buffer;

deleting the first-level memory buffer and any stored trace data, without transferring the trace data stored in the first-level memory buffer, in response to that the subroutine successfully completes execution, and transferring all contents of currently existing memory buffers to a storage device, in response to that an error or a failure occurs during running the program, wherein the transferred contents of the currently existing memory buffers are used to debug the error or the failure without attempting to recreate the error or the failure.

18. The computer program product according to claim 17, wherein the method steps further comprises:

writing the entry data of the subroutine to the main memory buffer when the subroutine is called in the program.

19. The computer program product according to claim 17, wherein the method steps further comprises:

writing the exit data of the subroutine to the main memory buffer when the subroutine completes execution.

\* \* \* \* \*